Oct. 19, 1954

J. A. WOFFORD 2,692,144

AUTOMOBILE DOOR MAT

Filed April 24, 1953

Jack A. Wofford
INVENTOR.

Patented Oct. 19, 1954

2,692,144

UNITED STATES PATENT OFFICE 2,692,144

AUTOMOBILE DOOR MAT

Jack A. Wofford, Forest City, N. C.

Application April 24, 1953, Serial No. 350,957

2 Claims. (Cl. 280—164)

The present invention relates to automotive accessories, generally speaking, and has more particular reference to an automobile door mat, that is, a mat which is situated in alignment with the door and doorway and is exteriorly disposed so that the user may clean the sole portions of his shoes before stepping into the tonneau of the automobile.

It is a matter of common knowledge to those skilled in the art to which the invention relates, that so-called running board mud and shoe scrapers and shoe cleaning mats have been evolved and produced by others for use. By contrast, the present invention has to do with a small foot wiper of coarse fabricated material which is permanently installed to extend outwardly and downwardly to assume a convenient slant to assist one in readily and conveniently using the same.

Briefly summarized, the invention has to do with the combination aspect of the concept; namely, a vehicle body structure having a vertical side with a doorway having a sill and said side having an apron depending below the plane of said sill, an outwardly and downwardly inclined door mat overhanging said apron in general alignment with said doorway, the upper edge of said mat being in a plane substantially common with the plane of said sill, and means for fastening said mat to and suspending it from said sill.

More specifically, the invention has to do with a new article of manufacture which is characterized by a rigid metal backing plate with the mat or wiping material adhesively secured thereto and which plate has a longitudinal attaching flange along one edge and is provided adjacent to said edge with a depending rib serving as a stabilizer.

Then, too, novelty is predicated on a plate with a mat thereon, said plate being of bendable sheet material which is bent upon itself along one edge to provide the stabilizing rib as well as the attaching flange.

Other objects, features and advantages will become more readily apparent from the following description and the accompanying sheet of drawings.

In the accompanying drawings wherein like numerals are employed to designate like parts throughout the views.

Figure 1:
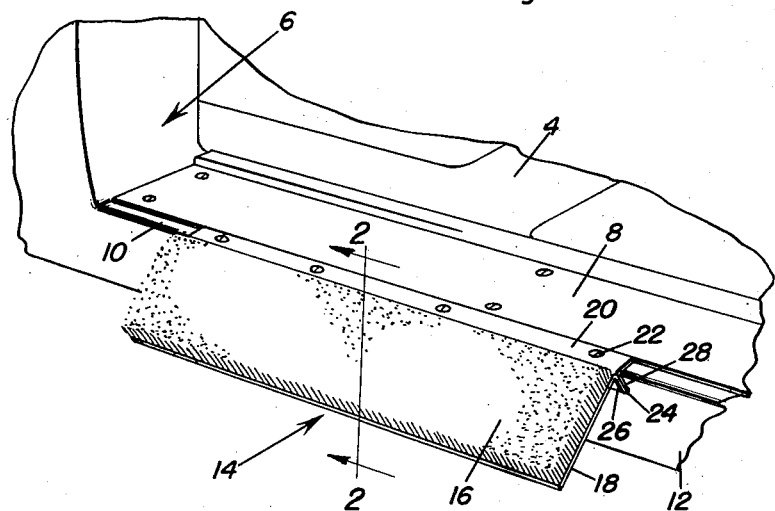
Figure 1 is a fragmentary perspective view showing a portion of an automobile body representing the floor and doorway and sill and showing the door mat in the manner in which it is constructed and used.
Figure 2:
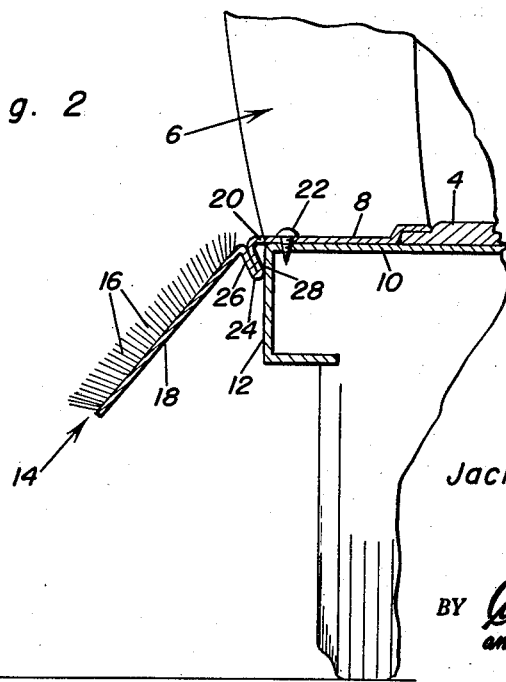
Figure 2 is a section through the same which may be said to be taken on the line 2—2 of Figure 1.

Referring now to the drawings by reference numerals and lead lines, the floor of the automobile body structure is denoted by the numeral 4 and the doorway or door opening is denoted at 6 and 8 denotes a sill plate mounted on the sill portion 10. The vertical depending exterior portion may be conveniently identified as an apron of the body side which depends below the sill. More specifically, the apron is identified by the numeral 12.

The permanently installed readily attachable and detachable door mat is denoted, as a general implement, by the numeral 14. The mat proper is a coarse fabricated type which may be said to be made up of stubble-like bristles 16. As a matter of fact, this sort of a mat could be a cut portion of a common type of outside door mat which is now on the open market. In any event, the mat is generally rectangular and of a length to cooperate with the door opening and is neither too long nor too wide for it might otherwise constitute an objectionable obstruction. The mat is mounted on a rigid sheet metal backing plate 18. One longitudinal edge portion of the plate is fashioned into a flange 20 which is superimposed on the door sill and is secured thereto by screws or similar fastenings 22. The portion of the plate between the flange and the adjacent edge of the brush-like mat is formed into a longitudinal rib. Specifically, the plate is bent upon itself as at 24 to provide abutting portions 26 and 28 which together form a rib. The rib is sturdy and provides a stabilizer and rests against the apron 12 in the manner shown to thus support the mat in a firm and downwardly inclined usable position.

It will be noticed, of course, that the door mat is a permanently attached and therefore conveniently usable item. It is simple, practical, economical and reliable. It may be readily applied and removed and is calculated to successfully fulfill the requirements of an article in this category of invention. Its construction is that, it is belived, will meet the respective requirements of manufacturers and users and those handling the sale and distribution of automotive accessories. It is in a plane below the lower edge of the door and will not interfere with the opening and closing of the door and being at a slant it is more or less self draining during the course of a rain.

Reverting to certain of the structural characteristics of the subject matter covered it is to be explained that in actual practice there are many makes of automobiles wherein the sill 10 is not, of course, flat or of the approximate shape shown in the drawings here. In such circumstances it will be clear that the flange 20 will consequently have to be shaped up and otherwise made to conformably cooperate with the particular style of sill on which it is to be superimposed and fastened. It is also to be pointed out that the bristles 16 need not, of course, be of fibrous material. They may be molded of rubber or otherwise may, even of metal under which circumstances they will be welded, adhesively attached, molded or whatever the varying circumstances require.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In combination, a vehicle body structure having a vertical side with a doorway having a sill and said side having an apron depending below the plane of said sill, an outwardly and downwardly inclined door mat overhanging said apron in general alignment with said doorway, the upper edge of said mat being in a plane substantially common with the plane of said sill, and means for fastening said mat to and suspending it from said sill, said means being an attaching and hold-down flange superimposed on and secured to said sill, said means also embodying a lengthwise stabilizing rib at an angle to said flange and propped and braced against said apron.

2. As a new article of manufacture an automobile door mat adapted to be mounted on the side of a doorway comprising a flat rectangular backing plate provided on one side with brush-like bristles, one edge of the plate extending beyond the adjacent marginal edge of the bristles and providing an apertured attaching flange, said edge being bent upon itself at an angle to said flange to provide a lateral lengthwise stabilizing rib.

References Cited in the file of this patent

UNITED STATES PATENTS

| Number | Name | Date |
| --- | --- | --- |
| 287,242 | Collins | Oct. 23, 1883 |
| 469,031 | Post | Feb. 16, 1892 |
| 1,022,950 | Jones | Apr. 9, 1912 |
| 1,698,005 | Stanwood | Jan. 8, 1929 |
| 2,296,629 | Coppock | Sept. 22, 1942 |